Feb. 15, 1927.
E. O. SEITZ
1,617,423
VEHICLE LAMP
Filed March 26, 1923      2 Sheets-Sheet 1
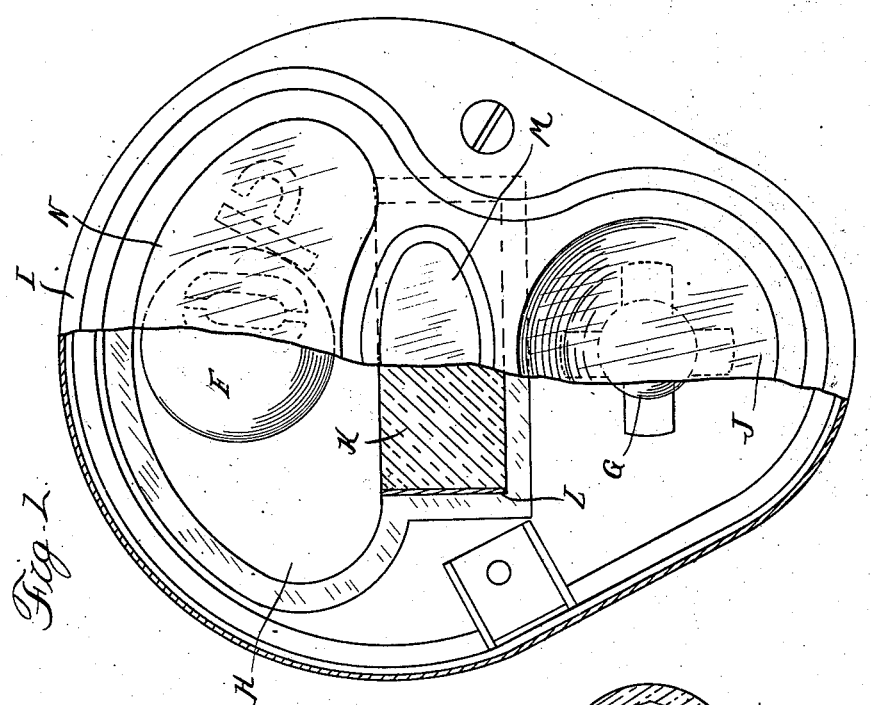
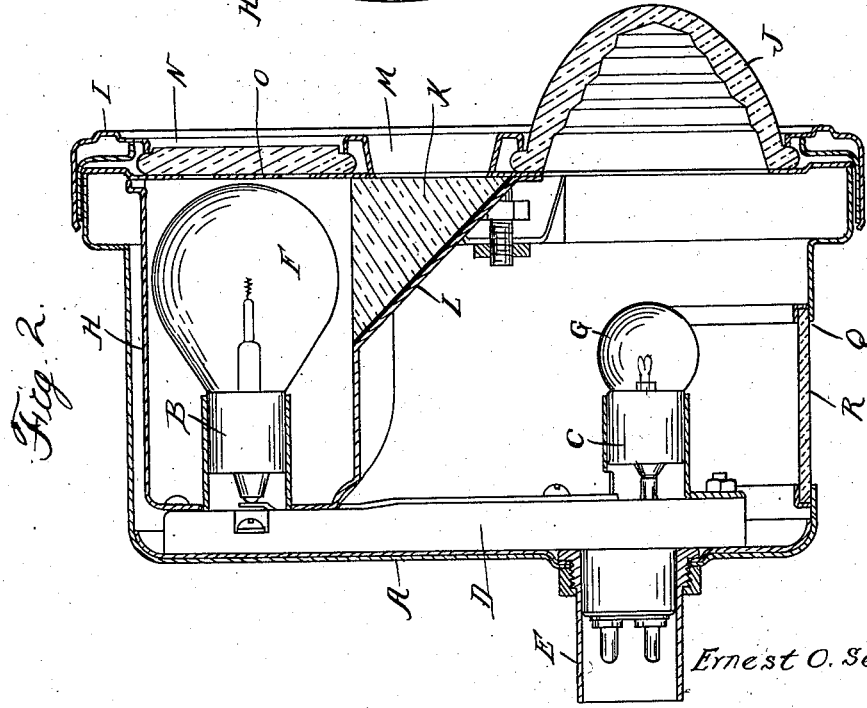
Inventor
Ernest O. Seitz
By Whittemore Hulbert Whittemore
 & Belknap      Attorneys Feb. 15, 1927.
E. O. SEITZ
1,617,423
VEHICLE LAMP
Filed March 26, 1923 2 Sheets-Sheet 2
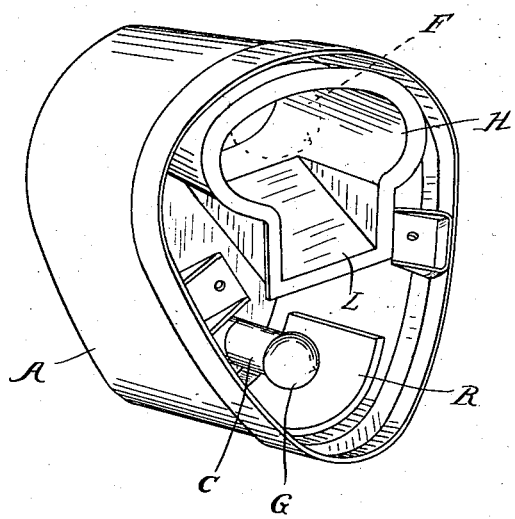
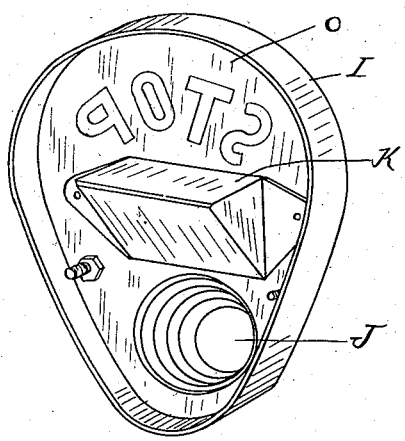
Inventor
Ernest O. Seitz
By Whittemore Hulbert Whittemore
 Belknap Attorneys Patented Feb. 15, 1927.

1,617,423

UNITED STATES PATENT OFFICE.

ERNEST O. SEITZ, OF DETROIT, MICHIGAN, ASSIGNOR TO C. M. HALL LAMP CO., OF DETROIT, MICHIGAN, A CORPORATION OF MICHIGAN.

VEHICLE LAMP.

Application filed March 26, 1923. Serial No. 627,910.

The invention relates to vehicle lamps and has more particular reference to a construction designed for use as a combined stop light and tail light.

It is one of the objects of the invention to provide means for illuminating the road in rear of the vehicle when it is being backed. It is a further object to combine this illuminating means with a stop light so that a single lamp may serve for both purposes. With these and other objects in view the invention consists in the construction as hereinafter set forth.

In the drawings:

Figure 1 is an elevation of the lamp partly in section;

Figure 2 is a central longitudinal section;

Figures 3 and 4 are perspective views of the lamp casing and door or cover respectively.

A is the outer casing having arranged therein a pair of lamp sockets B and C, these being preferably mounted on an insulator block D and provided with a common socket E for engaging a connector plug. The socket B is adapted to receive a relatively high candle power lamp F for intermittent operation, while the socket C has a low candle lamp G for constant operation as a tail light. The two lamps are arranged in different compartments of the casing, preferably by forming an inner casing H which surrounds the socket B and lamp F and which extends outward into contact with the cover or door I. The light from the lamp G passes through the lenses or colored glass J, which latter is preferably of bull's-eye form so as to be visible not only from the rear but also from the sides of the vehicle.

As usually installed, stop lights for vehicles are controlled by a switch actuated by the brake pedal, so that whenever a brake is applied the stop signal will be flashed. My improved construction is designed to operate in a similar manner, but in addition to displaying the warning stop signal, I have provided means for illuminating the road in the rear of the car. This is particularly advantageous when the vehicle is to be backed, as it enables the operator to ascertain whether the path is clear from obstruction. It is usual to have the stop light display the word "Stop" in colored letters so as to avoid any glare. This would furnish but slight illumination for the road and to provide for greater illumination without additional lamps, I have devised the following construction:

K is a prism which is placed in a pocket L formed in the bottom of the inner casing H beneath the lamp bulb F. M is a window in the cover I arranged in front of the prism K. The form of the prism is so selected that the rays from the lamp F which pass downward are bent at the desired angle to illuminate the road in rear of the vehicle without shining upward or producing any glare.

The cover I is preferably formed with a segmental panel N for the stop light, the window M beneath this panel and the bull's-eye J beneath the window M. There is also preferably an opaque shield O adjacent to the panel N, said shield being cut out to display the word "Stop."

With the construction as described, when the vehicle is running at uniform speed, the lamp G alone is illuminated, but when the brake pedal is operated, the stop signal is displayed. At the same time the road in rear of the vehicle is brightly illuminated, which is useful to the driver of the following car in avoiding collision. Where it is desired to back the car, the brake pedal is operated sufficiently to close the switch and operate the lamp F, but it is not necessary in so doing to apply the brakes. This is for the reason that, as usually adjusted, there is considerable lost motion in the brake pedal, and therefore the switch is closed before the brakes take effect. The rays from the lamp F passing through the prism will be directed at a predetermined angle which is selected so as to produce the best lighting effect.

In addition to the window openings in the cover of the lamp, there is provided an opening Q at the bottom of the casing having the transparent panel R through which rays of white light will pass to illuminate the license number.

What I claim as my invention is:

1. In a vehicle lamp, the combination with the casing, of a plurality of lamp bulbs therein, an inner casing for separating one of the bulbs from the other, a cover for the outer casing having a plurality of window openings therein, one opposite said inner casing constituting a stop signal, a bull's- eye lens for another window in the outer casing, a third window intermediate the windows aforesaid, and a prism opposite said last mentioned window for refracting the lateral rays of one of said lamp bulbs in a downwardly inclined direction.

2. In a vehicle lamp, the combination with the casing having a plurality of lamp bulbs therein, means within said casing for separating said bulbs, a lens apposite one of said bulbs constituting a tail-light, a stop lens adjacent the other of said bulbs, and means associated with said casing for refracting the rays from said stop light at the desired angle to illuminate the road in rear of the vehicle.

3. In a vehicle lamp, the combination with a casing, of a plurality of lamp bulbs therein, a cover for said casing, an inner casing for separating said bulbs having a portion thereof bent downwardly cooperating with the cover to form a pocket, a lens apposite the bulb in the outer casing constituting a tail-light, a stop lens opposite the bulb in the inner casing, a window in said cover positioned below said stop lens, and a prism located in said pocket for refracting lateral rays from the bulb in the inner casing in a downwardly inclined direction through said window.

In testimony whereof I affix my signature.

ERNEST O. SEITZ.